United States Patent [19]

Braunberger et al.

[11] Patent Number: 5,161,357
[45] Date of Patent: Nov. 10, 1992

[54] SICKLE BAR JOINT SPLICE CONSTRUCTION

[75] Inventors: Benjamin A. Braunberger, Fond du Lac; Neal J. Stoffel, Campbellsport, both of Wis.

[73] Assignee: Kondex Corporation, Lomira, Wis.

[21] Appl. No.: 755,943

[22] Filed: Sep. 6, 1991

[51] Int. Cl.$^5$ .................................. A01D 34/14
[52] U.S. Cl. .................................. 56/300; 403/312
[58] Field of Search ................ 56/296, 297, 299, 300, 56/301, 302, 303; 403/341, 408.1, 312, 310, 309

[56] References Cited

U.S. PATENT DOCUMENTS

| | | | |
|---|---|---|---|
| 30,595 | 11/1860 | Smith | 56/300 |
| 329,696 | 11/1885 | Barnes | 56/299 |
| 443,791 | 12/1890 | Palmer | 56/300 |
| 668,486 | 2/1901 | Brown | 56/302 |
| 769,133 | 8/1904 | Grant | 56/299 |
| 984,349 | 2/1911 | Carson | 56/302 |
| 1,340,868 | 5/1920 | Aidlotte | 56/300 |
| 4,805,390 | 2/1989 | Majkrzak | 56/300 |
| 4,854,114 | 8/1989 | Speck | 56/296 |
| 4,942,728 | 7/1990 | Loring | 56/296 |
| 5,024,051 | 6/1991 | Glass et al. | 56/300 X |

Primary Examiner—Stephen J. Novosad

[57] ABSTRACT

A splice assembly joins two short or broken sickle bars with their attached cutter sections. The sickle bars and cutter sections have a series of aligned holes. Top and bottom splice plates sandwich the bars and cutter sections, and have a series of openings that register with the holes in the bars and cutter sections. The outer surface of each plate is countersunk at the openings, and a plurality of bolts with conical heads are received in the countersunk openings in one plate and a plurality of nuts with conical ends are threaded onto the bolts and received in the countersunk openings of the other plate.

3 Claims, 2 Drawing Sheets

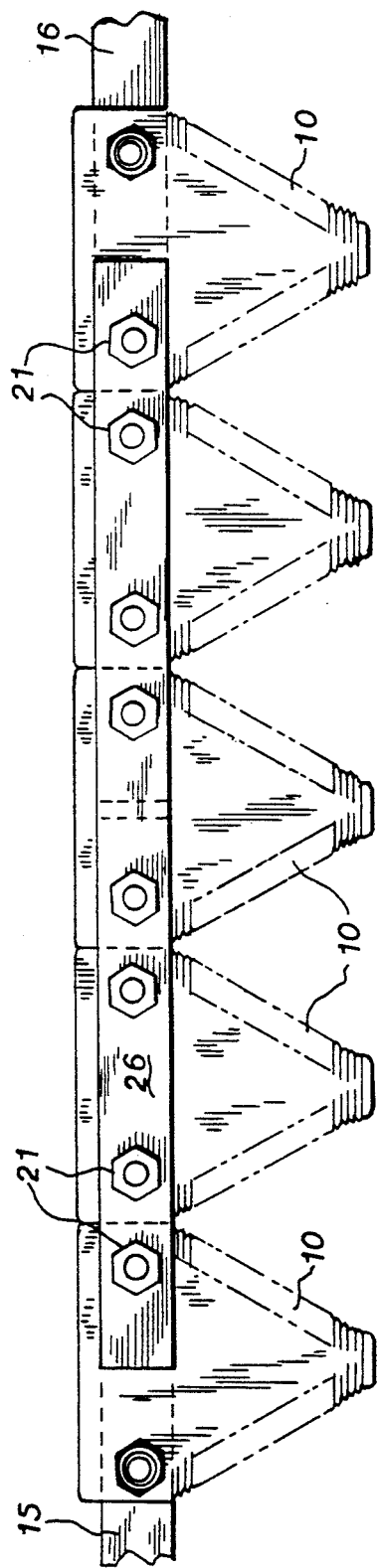
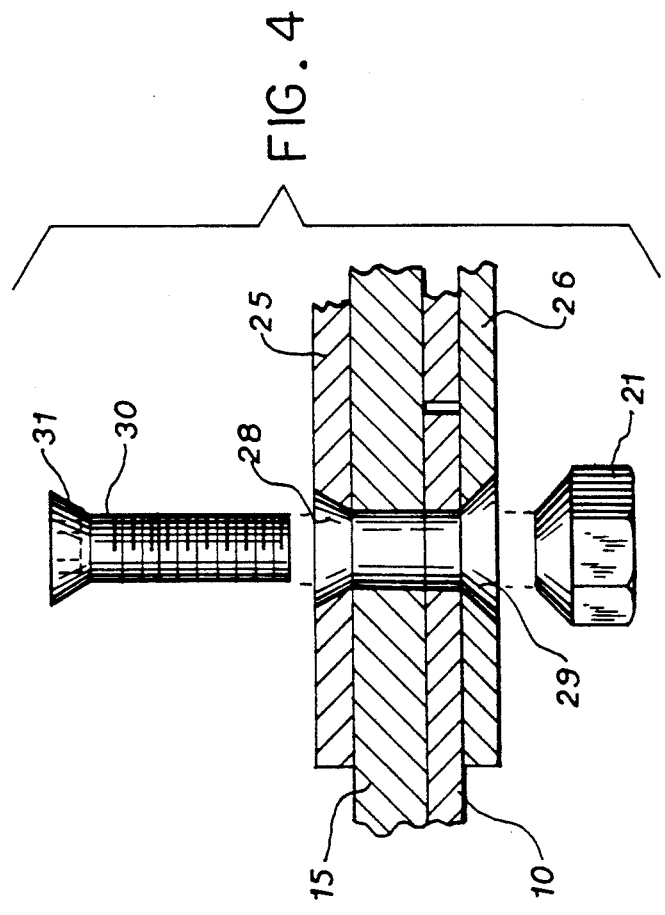

SICKLE BAR JOINT SPLICE CONSTRUCTION

BACKGROUND OF THE INVENTION

This invention relates to sickles, and particularly to an improved construction for splicing the bar that mounts sickle cutter sections.

Sickles are widely used in mechanical apparatus for cutting and harvesting. Sickles typically contain an elongated bar to which is attached a plurality of triangular tooth sickle cutter sections arranged side by side along the length of the bar. The bar with the attached sickle sections is reciprocated relative to a guard structure and the material to be cut is caught between the reciprocating cutter sections and the guards. The sickles, and therefore the sickle bars, can be very lengthy. A thirty foot sickle bar is not uncommon.

The sickle sections will ocasionally break or become excessively worn. The sickle cutter sections are typically attached to the bar by some form of removable fasteners such as bolts, so that it is relatively simple to replace one or more sickle sections. However, when a bar breaks, or an entire length of assembled bar and sickle sections must be replaced, it is necessary to transport a very long flat bar. The cost of shipping such a part is very expensive in terms of its intrinsic value.

The present invention provides a splice construction for joining shorter or broken sections of sickle bars.

SUMMARY OF THE INVENTION

In accordance with the invention, a splice joins two lengths of sickle bars with side-by-side sickle cutter sections, the bars and cutter sections having a series of aligned through holes. The splice includes upper and lower splice plates which sandwich the bars and cutter sections and extend in both directions from the joint of the bars. The splice plates have openings that align with the holes of the cutter sections and bars. The outer surface of each plate is countersunk at the openings. A plurality of bolts having conical heads are received in the countersunk openings in one plate and a plurality of nuts are threaded onto the bolts. The nuts have a conical end received in the countersunk openings of the other plate.

The resulting splice has a combined thickness that is at most only slightly greater than the thickness of the sickle assemblies that it joins. As a result, the splice accommodates the normal hold down clips and guards that are normally used with sickle cutters. Also, the splice does not add significantly to the resistance of the sickle through the material that it cuts.

It is a principal object of the invention to provide a simple and rugged sickle splice that adds minimally to the overall thickness of the sickle.

The foregoing and other objects and advantages of the invention will appear in the following detailed description of the invention. In the description, reference is made to the accompanying drawings which illustrates a preferred embodiment of the invention.

BRIEF DESCRIPTION OF THE DRAWINGS

FIG. 3 is a bottom plan view of the sickle; and

FIG. 4 is an enlarged expanded view, in vertical section, through the splice.

DETAILED DESCRIPTION OF THE PREFERRED EMBODIMENT

Figure 1:
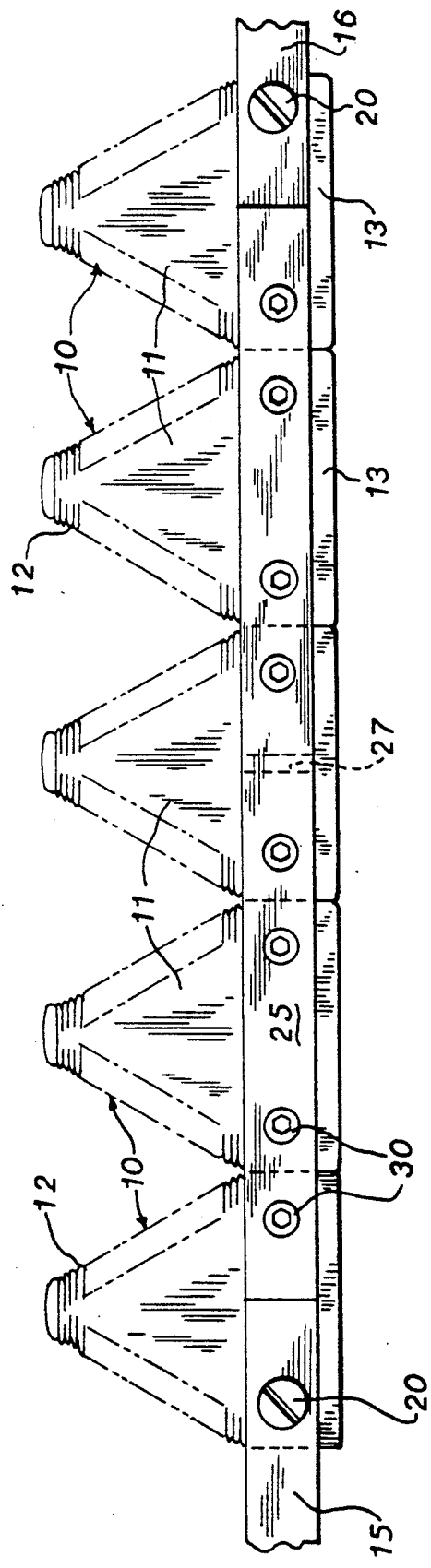
FIG. 1 is a top plan view of a length of sickle incorporating the splice of the present invention.

Referring to the drawing, a sickle is formed with a plurality of identical sickle cutter sections 10 whose forwardly projecting tooth portions 11 have serrated cutting edges 12. The rear of each sickle section 10 is shaped as an extending rectangular mounting portion 13. The sickle sections 10 are adapted to be disposed side-by-side along a sickle bar.

The sickle bar is formed of longitudinally abutting flat sickle bars 15 and 16. The sickle sections 10 are attached to the bars 15 and 16 by slotted bolts 20 received in aligned holes in the sickle sections 10 and the sickle bars 15 and 16. The slotted bolts 20 receive lock nuts 21. The purpose of the splice of this invention is to join the sickle bars 15 and 16 while also accommodating the sickle sections 10.

The splice includes top and bottom splice plates 25 and 26 that overlie two lengths of sickle sections 10 on both sides of the split 27 between the sickle bars 15 and 16 and which sandwich the sickle bars and sickle sections. The splice plates 25 and 26 each have openings 28 and 29, respectively, that are spaced to align with the openings in the sickle bars 15 and 16 and the sickle sections 10. The plates 25 and 26 are countersunk at the openings 28 and 29, with the countersinks facing outwardly.

The splice plates 25 and 26 are joined to the sickle bars and sickle sections by bolts 30 having conical heads 31 received in the countersinks in the top splice plate 25. The conical heads 31 have hexagonal recesses to accept a tool. The lock nuts 21, which normally have one side formed with a conical surface, are inverted and this conical surface is received in the countersink in the bottom splice plate 26.

As seen in FIGS. 1 and 3, the splice preferably is arranged so that a sickle cutter section 10 spans the split 27 between the bars 15 and 16 to enhance the strength of the splice.

Figure 2:
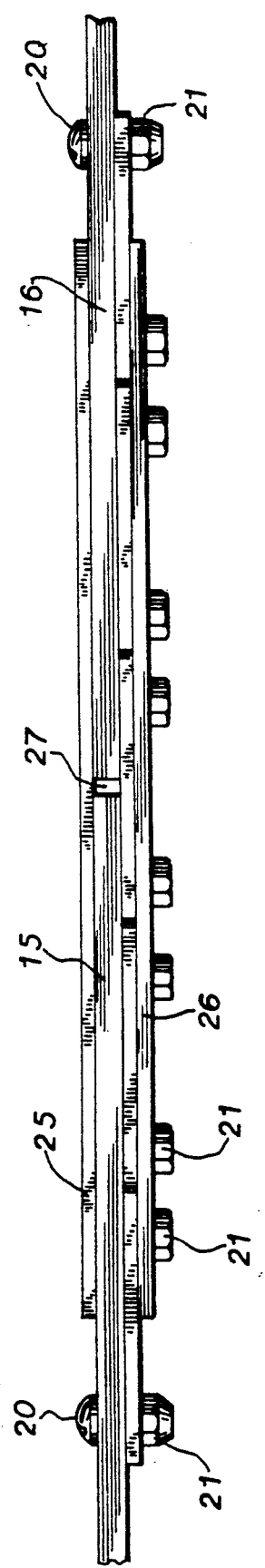
FIG. 2 is a side view in elevation of the sickle of FIG. 1.

As seen in FIG. 2, the resulting splice assembly has a total thickness that is equal to or not substantially greater than the thickness of the sickle beyond the splice, even through top and bottom plates 25 and 26 have been added to provide necessary strength to the split 27 between the sickle bars. The splice does not add appreciably to the resistance of the sickle moving through the material being cut. Furthermore, the splice will fit under the hold-down clips and through the throats of guards that are typically used with sickles.

The splice is usable to repair broken lengths of sickle bars or to assemble lenghts of sickles from shorter lengths of sickle bars that are easier and less costly to transport.

We claims:

1. A splice assembly for a sickle having sickle sections joined to sickle bars by fasteners extending through aligned openings in the sickle sections and sickle bars, the assembly comprising:
    top and bottom splice plates each having a series of openings that align with openings in the sickle sections and sickle bars, the plates being countersunk at the openings and the countersinks facing outwardly from the sickle;

a threaded bolt for each opening, the bolts having conical heads adapted to be received in the countersunk openings in one of the splice plates; and nuts adapted to be threaded on the bolts, said nuts having a conical surface on one side adapted to be received in the countersunk openings in the other splice plate.

2. A splice assembly in accordance with claim 1 wherein the bolts have recesses in the bolt heads that are engageable by a tool.

3. A splice assembly in a accordance with claim 2, wherein the recesses are hexagonal.

* * * * *